Oct. 25, 1960     H. DERSCHMIDT     2,957,526
DRIVE MEANS FOR HELICOPTER ROTARY BLADE SYSTEMS
Filed July 9, 1956     5 Sheets-Sheet 1
FIG. 1     FIG. 2     FIG. 3
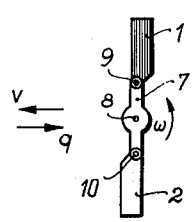 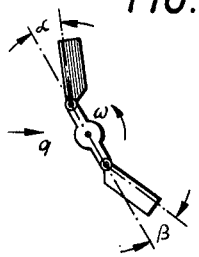 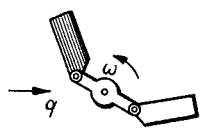
FIG. 4     FIG. 5     FIG. 6
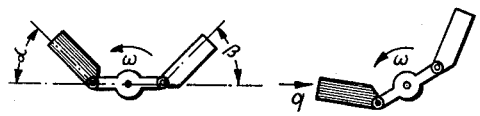 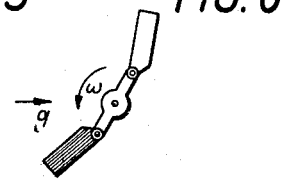
FIG. 7     FIG. 8     FIG. 9
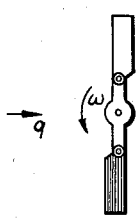 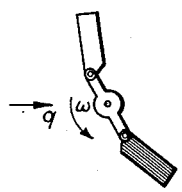 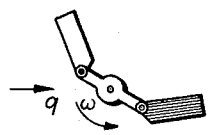
FIG. 10     FIG. 11     FIG. 12
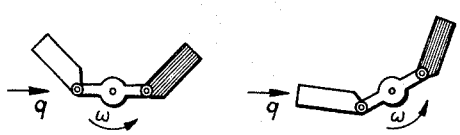 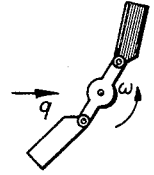
FIG. 13     FIG. 14
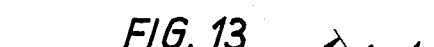 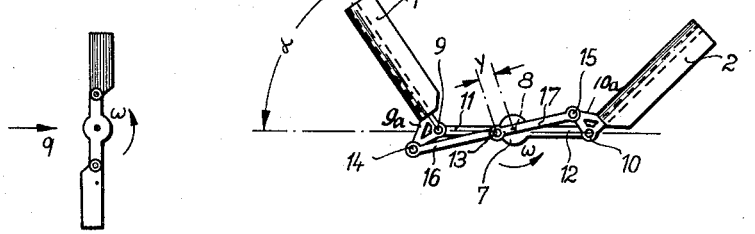
INVENTOR
HANS DERSCHMIDT
BY *Leon M. Strauss*
AGT.

Oct. 25, 1960     H. DERSCHMIDT     2,957,526
DRIVE MEANS FOR HELICOPTER ROTARY BLADE SYSTEMS
Filed July 9, 1956     5 Sheets-Sheet 2
FIG. 15     FIG. 16     FIG. 17
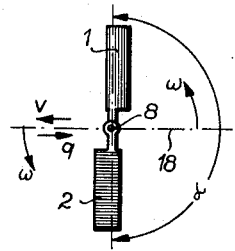
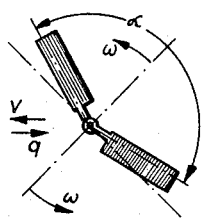
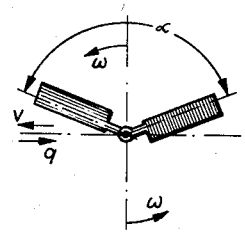
FIG. 18     FIG. 19     FIG. 20
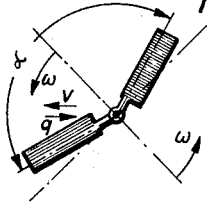
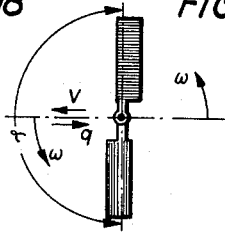
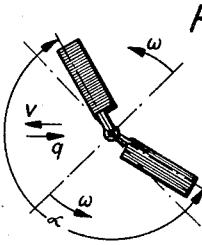
FIG. 21     FIG. 22     FIG. 23
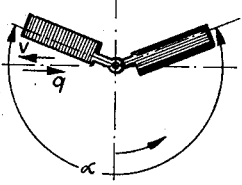
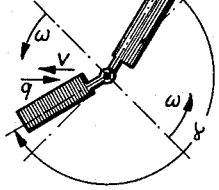
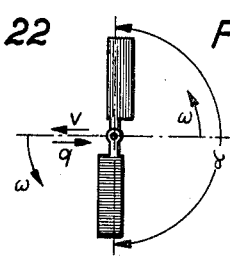
FIG. 24
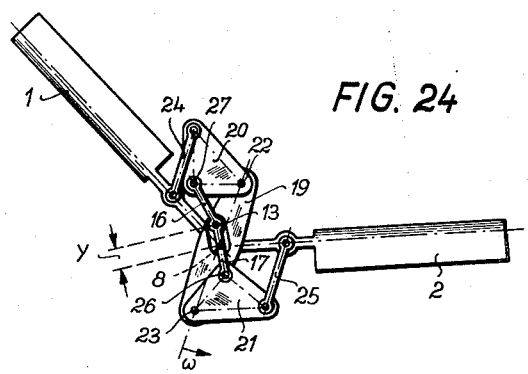
INVENTOR
HANS DERSCHMIDT
BY Oct. 25, 1960 H. DERSCHMIDT 2,957,526
DRIVE MEANS FOR HELICOPTER ROTARY BLADE SYSTEMS
Filed July 9, 1956 5 Sheets-Sheet 3

INVENTOR
HANS DERSCHMIDT

Oct. 25, 1960  H. DERSCHMIDT  2,957,526
DRIVE MEANS FOR HELICOPTER ROTARY BLADE SYSTEMS
Filed July 9, 1956  5 Sheets-Sheet 4

INVENTOR
HANS DERSCHMIDT
BY Leon M. Strauss

Oct. 25, 1960 H. DERSCHMIDT 2,957,526
DRIVE MEANS FOR HELICOPTER ROTARY BLADE SYSTEMS
Filed July 9, 1956 5 Sheets-Sheet 5

INVENTOR
HANS DERSCHMIDT

United States Patent Office 2,957,526
Patented Oct. 25, 1960

2,957,526

DRIVE MEANS FOR HELICOPTER ROTARY BLADE SYSTEMS

Hans Derschmidt, Bernhausen a. F., Germany, assignor to Bolkow Entwicklungen K.G., Stuttgart-Flughafen, Germany, a corporation of Germany Filed July 9, 1956, Ser. No. 596,558

Claims priority, application Germany July 9, 1955

3 Claims. (Cl. 170—160.13)

The present invention relates to rotary wing or blade systems for use in helicopters and like aircraft, and has as one of its objects the provision of means tending to improve the flight and stability characteristics of such helicopters.

Presently known helicopters or aircraft with rotary wing systems are limited with respect to their maximum attainable horizontal velocity because the air flow around the airfoil surfaces of the propeller blades becomes more non-uniform the higher the horizontal velocity. The maximum attainable velocity is actually determined on the one hand by the fact that the air speed of the forwardly moving foil surfaces or blade approaches the speed of sound and on the other hand by the fact that the rearwardly moving surfaces are contacted by air moving at such low speeds that the lift action of these surfaces breaks down periodically.

A great amount of power input is required to overcome the resistance of the blade profile when the non-uniformity of the air stream against the blades is to be minimized through the use of high, uniform peripheral speeds.

The non-uniformity of the incident air stream during rotation of the blades is the fundamental reason why known rotary wing systems can attain only relatively small horizontal velocities.

In known rotary wing aircraft as aforesaid, the non-uniform streaming of air around the blades during horizontal flight is compensated for or balanced out by wobbling movements or by periodical changing of the adjustment angle, i.e. by feathering of the blades, so that the moment equilibrium is effected about the longitudinal axis. In such cases, however, the lift characteristics of each of the individual foil or blade elements are necessarily altered very greatly during each rotation.

The non-uniform contact of foils of known rotary wing systems by the air stream in horizontal flight brings about a smaller mean profile efficiency for each rotation and makes it necessary to choose thinner profiles which even in suspended flights have greater power requirements, their very thinness affecting the rigidity and strength of the air foils or blades adversely.

The high peripheral foil tip speeds required in known rotary wing systems cause greater noises even during suspended flight. When a helicopter moves forwardly at higher horizontal speeds, the forwardly moving blades will be subjected in a shock-like or impact-like manner to air flowing at very high velocities. The consequently occurring slapping noise is usually found to be more irritating than the noise of propellers of airplane having rigid wings.

It is, therefore, one of the primary objects of the invention to provide means improving the performance and stability qualities of rotary blade or wing systems of the aforesaid type.

It is another object of the present invention to provide means contributing to counteraction or elimination of the action of non-uniformity of the air stream against the helicopter or like aircraft blades during rotation of the latter, whereby the advancing speed of said aircraft equipped with such a rotary blade system in horizontal direction may be markedly increased.

To these ends, the invention resides substantially in the fact that the blades, besides the uniform rotational movements, execute positive additional movements in the plane of rotation of the rotor. Through these additional movements, the non-uniformity of the air stream flowing against the blades at high horizontal speeds and small mean peripheral velocity of the blade tips is reduced or balanced out.

For a rotary wing system according to the invention, a similar condition obtains in horizontal flight as it exists in suspended flight.

A further object of the invention is to provide means enabling all disadvantages of the known devices which result from the necessary high peripheral velocity of the blade tips and from the large non-uniformity of the air flow about the blades to be minimized or completely eliminated.

According to another object of the invention, means are provided to ensure that the blade tips may be moved with substantially reduced peripheral velocities.

Still another object of the invention is to provide means conducive to thicker profiles with high lift coefficients in rotor structures as aforesaid which in conjunction with the great rotor diameters employed make possible the expenditure of minimum power during suspended flight.

Another advantage resulting from the implementation of the above-objects is that the rotary wing system can attain higher horizontal speeds with less power requirements, it is easier to control and it suppresses irritating noise to a greater extent than has heretofore been possible.

During the swinging movements of the blades, an additional movement thereof in the rotor plane in contrast to the uniform rotation of the rotor hub is executed. Upon accurately controlled swinging movements during one rotation in horizontal flight, the non-uniformity of the incidents of the air stream can be balanced out especially for the aerodynamically most effective outer parts of the blades.

This is the case when the forwardly moving blades are retarded with respect to their mean rotational speeds and when the rearwardly moving blades are accelerated with respect to their mean rotational speeds.

The known swinging movement which tends to adjust itself in accordance with the free play of forces exhibits, however, a general phase displacement relative to the construction according to the invention which have the desired operation, or in other words the non-uniformity of the air stream incident on freely swinging blades is greater than that of the air stream incident on blades without swinging movement.

In known rotary wing or blade systems, the swinging movement is, thus, damped by special mechanism in order to prevent increase of the air flow non-uniformity above controllable limits. Only by positively operating drive or control means as provided by the present invention can the additional blade movements be attained which, during horizontal flight, at all times minimize the non-uniformity of air flow against and about the blades.

These and other objects of the invention will become further apparent from the following detailed description, reference being made to the accompanying drawings, showing preferred embodiments of the invention.

In the drawings:

Figs. 1–13 illustrate schematically successive stages or positions of swiveling blades of a rotary system.

Fig. 14 shows schematically in elevation the position of the blades (as seen in Fig. 10) operatively connected to a drive mechanism according to the invention.

Figs. 15 to 23 illustrate schematically further successive steps or positions of the movements of a rotary blade about an axis.

Fig. 24 illustrates schematically a drive system positively directing the movement of the blades 1 and 2 in accordance with the stages of Figs. 15 to 23.

Figure 25:
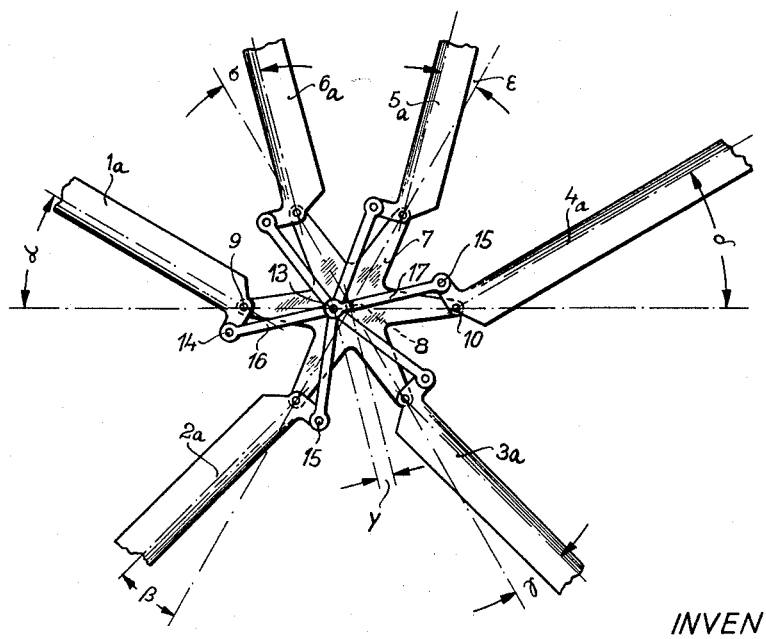
Fig. 25 shows diagrammatically a fragmentary top plan view of a rotary blade system with pivotable blades.

Referring now more particularly to the attached drawings, the invention will be more clearly described.

In Figs. 1 to 13, there are illustrated successive positions of blades or beaters 1 and 2 carrying out pivotal movements in a rotary system, whereby said pivotal movements reduce or counteract non-uniformity of air stream due to the translatory stream $q$ when the hub 7 rotates uniformly with angular velocity $w$ and advances with the translatory speed $v$.

In Fig. 14, there is shown an embodiment exemplifying control means according to the invention, whereby the pivotal movements of the blades 1 and 2 are positively enforced. The fixed eccentric pin 13 presents relative to the center axle 8 of hub 7 an eccentricity $y$. To blades 1 and 2 pivotable or rotatable about pins 9 and 10 which are located on arms 11 and 12, are connected arms 9a, 10a, which in turn extend at right angles to the spars of the blades, said arms terminating at the pins 14 and 15, respectively. Between these pins 14, 15 and eccentric pin 13, there extend connecting rods or elements 16 and 17.

When hub 7 rotates with uniform angular speed $w$, then the connecting rods 16, 17 due to the eccentricity $y$ of the eccentric pin 13, will impart to pins 14 and 15 a radial periodic movement so that both blades 1 and 2 are forced to execute pivotal movements according to the various positions indicated in Figs. 1 to 13 inclusive.

Referring to Figs. 15 to 23 it will be seen, that the non-uniformity of the air stream against blades 1 and 2 due to the translatory stream $q$ is somewhat counteracted when the angular bisector 18 of the blades rotates uniformly at an angular speed $w$ and the axle 8 advances with the translatory speed $v$.

Angle $\alpha$ performs during one revolution of the angle bisector 18 a periodic movement, whereby the blades run relative to the translatory stream $q$ with predetermined lag and run backwards with increased speed.

According to Fig. 24 the blades are rotatable about the common axis 8, the positions with respect to each other being, however, changeable or variable.

Rotatable about axis 8 is also crosspiece 19 which is operatively connected to the drive shaft, bell cranks or angle levers 20 and 21 being also rotatably journalled about said drive shaft on pins 22 and 23. The fixedly arranged eccentric pin 13 shows an eccentricity $y$ relative to axis 8. Angle levers 20 and 21 are joined via connecting rods 16 and 17 with said eccentric pin 13 and via connecting rods 24, 25 with the blades 1 and 2.

When the crosspiece 19 rotates with angular speed $w$, then due to the eccentricity $y$ of the eccentric pin 13 a radial oscillation will be imparted to pins 26 and 27. The said levers 20, 21 translate this oscillatory movement to a pivotal or sway movement (similar to the movement of the blades according to Figs. 1 to 13), which is transmitted to the blades, so that the desired movement is initiated.

Referring now further to Fig. 25, there is depicted a rotary blade system having a plurality of oscillatable or pivotable blades 1a, 2a, 3a, 4a, 5a, and 6a, which during rotation will not permit any substantial displacement of the center of gravity, the latter always remaining fixed on that side where the blades are closer together (for instance, between blades 5a and 6a).

Figure 26:
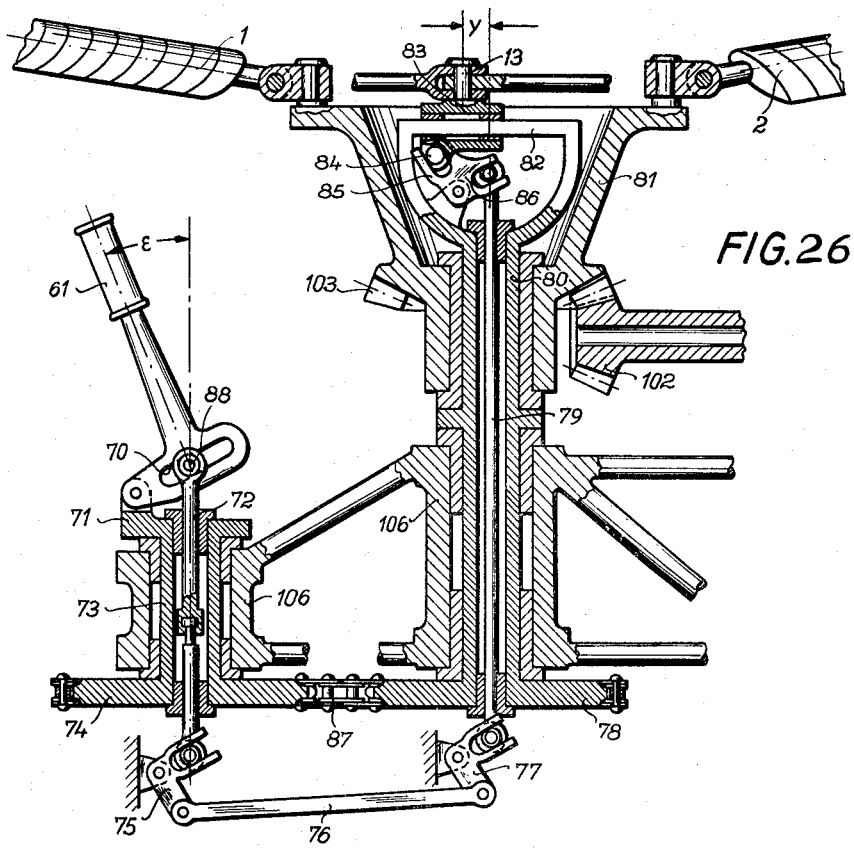
Fig. 26 illustrates a more complete control device embodying the invention, and shown partly in section, illustrating changes of the position of the eccentric pin.

As seen in Fig. 26 through movement of the control stick 61 the position of the eccentric pin 13 may be readily adjusted. The angle of movement $\epsilon$ of the control stick 61 corresponds to the displacement $y$ of the eccentric pin 13. Thus, the swinging movement $\alpha$ of the blades (Fig. 27) may be readily achieved. This occurs through creation of differences in speed of the oncoming air stream for the blades at opposite sides thereof.

Figure 27:
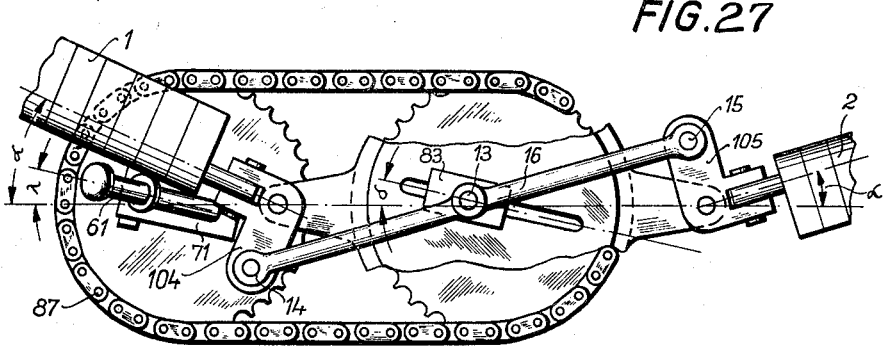
Fig. 27 is a top plan view of the device seen in Fig. 40.

As can be seen from Figs. 26 and 27 the control stick 61 is pivoted on a support 71. This support is jointed with the sprocket or chain wheel 74 by means of tubular shaft 73 which is pivotally anchored on the fuselage 106. Slide pin 88 of the control rod 72 is engaged in a guide slot or guideway 70 of the control stick 61. The bell crank levers 75 and 77 are also pivoted on the fuselage, and are connected respectively to control rods 72 and 79. Levers 75 and 77 are interconnected by lever 76. The bell crank 85, which receives in guideway 86 pin 84 is connected to a support 83 which carries eccentric pin 13. Support 83 is adjustably carried on guide rod 82. Tubular shaft 80 which is pivotally supported in a bearing of the fuselage is connected to said guide rod 82 on the one hand and to sprocket or chain wheel 78 on the other hand. Chain 87 is trained over the sprocket wheels 74 and 78 (Fig. 27).

Eccentric pin 13 is carried as aforesaid by support 83, said pin 13 being operatively connected with pins 14 and 15 to which connecting rods 16 and 17 are joined. Pins 14 and 15 are further connected to the end of angle arms 104 and 105, respectively, which in turn are pivotally connected to blades 1 and 2 and extend at right angles to pins 14 and 15. The rotary hub 81 is driven by a bevel gear arrangement 102, 103 as is evident from Fig. 26.

If the control stick 61 performs an angular displacement $\lambda$ support 71, sprocket wheels 74 and 78, guide bar 82 will be angularly displaced to the amplitude $\delta$ which is equal to $\lambda$.

If the control stick 61 performs an angular displacement $\epsilon$ control rod 72, 79 via 76 and support 83 will be displaced, resulting from an eccentricity $y$ of the eccentric pin 13. Upon changing the displacement $\epsilon$ and $\lambda$ of the control stick 61 the eccentricity of the eccentric pin can be adjusted and controlled as to size and angularity.

If the rotor hub 81 rotates pins 14 and 15 are forced to swing in radial direction from which a lagging movement of the blades results corresponding to respective positions shown in Figs. 1 to 13. Thus, it is possible to obtain control effects for the blades of the rotary blade system.

Figure 28:
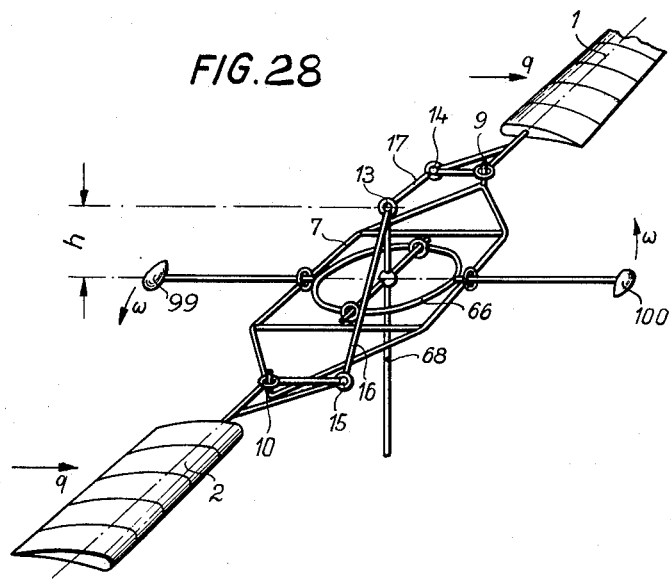
Figs. 28 and 29 illustrate two different positions of control of a rotary system with improved natural stability qualities and exemplify a further embodiment of the invention.
Figure 29:
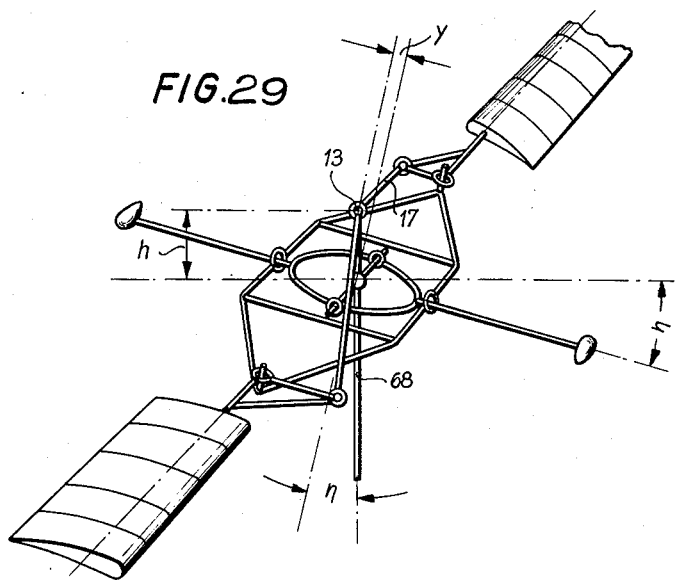

According to Figs. 28 and 29 hub 7 is pivoted by means of a gimbal 66 on rotor beam 68. Blades 1 and 2 and suitable hinges 9 and 10 are pivotally connected by means of connecting rods 16, 17 to a ball and socket joint corresponding to the eccentric pin 13. Axial difference $h$ in height is provided between the ball joint 13 and the center of the gimbal. Counter weights 99 and 100 are guided by centrifugal forces and serve as stabilizers.

Hub 7 rotates around the axis with angular speed $w$. The ball joint then presents no eccentricity relative to the axis of the beam and the blades 1 and 2 are prevented from performing a swinging movement due to the connecting rods 16 and 17. Assuming that to these blades during hovering conditions a horizontal gust $q$ is applied, the lift of a blade 1 advancing relative to the gust will be higher than the lift of blade 2 receding with the gust. The blades begin to flap and the rotor disk will be tilted backward at an angle of $n$ (Fig. 29).

As the beam 68 due to inertia remains in its previous position an eccentricity $y$ results due to the difference in height $h$ of the ball joint end and swinging movements of the blades are initiated by said connecting rods. Through controlled swinging movements the blades have nearly no fluctuation of blast although the gust remains effective and a lift balance between the two blades is attained, as it were the case during hovering condition, before a gust occurred.

Various changes and modifications may be made without department from the spirit and scope of the present invention and it is intended that such obvious changes and modifications be embraced by the annexed claims.

Having thus described the invention, what is claimed as new and desired to be secured by Letters Patent, is:

1. In a rotary blade system for aircraft adapted for horizontal flight; rotatable hub means including a pair of fixed rigid arms and having a substantially vertical axle adapted to be driven at uniform angular velocity, a plurality of elongated blades arranged horizontally in spaced relation to each other and pivoted to said arms and rotatable therewith, said blades being located substantially in a common horizontal plane and being movable for lead and lagging blade movements in said plane, control means including a pair of connecting elements pivotally connected to said blades and adapted to effect predetermined movements thereof in said common plane and relative to said hub means, whereby said blades may be adjusted in position relative to said hub means for overcoming non-uniform effects of air flowing past said blades during rotation of said hub means and concurrent horizontal flight of said aircraft, said control means further including a pivot pin spaced from and located in an eccentric position relative to said hub means, said connecting elements being pivoted to said pin and being oscillatable during rotation of said hub means, and bell crank lever means pivoted to said connecting elements and said arms for translating oscillatable movements into swinging movements of said blades.

2. In a system according to claim 1; said blades being pivotable in said common plane relative to each other, said control means pivoting both said blades in a direction rearward with respect to the direction of said horizontal flight of said aircraft.

3. A rotary blade system according to claim 1, including means operatively connected to said vertical axle for adjusting the magnitude and direction of the eccentricity of said pivot pin relative to said hub means.

References Cited in the file of this patent

UNITED STATES PATENTS

| | | |
|---|---|---|
| 2,120,168 | Ash | June 7, 1938 |
| 2,364,496 | Vogel | Dec. 5, 1944 |
| 2,368,698 | Young | Feb. 6, 1945 |
| 2,611,441 | Slechta | Sept. 23, 1952 |
| 2,614,639 | Richard | Oct. 21, 1952 |
| 2,627,928 | Mullgardt | Feb. 10, 1953 |
| 2,684,122 | Perry | July 20, 1954 |
| 2,776,718 | Zuck | Jan. 8, 1957 |

FOREIGN PATENTS

| | | |
|---|---|---|
| 1,084,706 | France | Jan. 24, 1955 |